3,038,898
6-FLUOROMETHYL-9α,11β-DICHLORO-CORTICAL HORMONES

Albert Bowers and John Edwards, Mexico City, Mexico, assignors to Syntex S.A., Mexico City, Mexico, a corporation of Mexico
No Drawing. Filed Nov. 10, 1960, Ser. No. 68,375
30 Claims. (Cl. 260—239.55)

The present invention relates to novel cyclopentanophenanthrene compounds and to a novel process for the production thereof.

More particularly the present invention relates to novel C-6-monofluoromethyl and C-6-polyfluoromethyl cortical hormone derivatives and more specifically to derivatives of 9α,11β-dichloro-Δ⁴-pregnene - 17α,21-diol - 3,20 - dione which may also contain a methyl group in α or β configuration at C-16, a hydroxy or acyloxy group at C-16α, the cyclic acetal or cyclic ketal grouping at C-16α,17α and further unsaturation at C-1,2.

The novel compounds of the present invention which are potent anti-inflammatory agents which can be administered topically without producing systemic effects or producing only negligible systemic corticoid activity are represented by the following formulas:

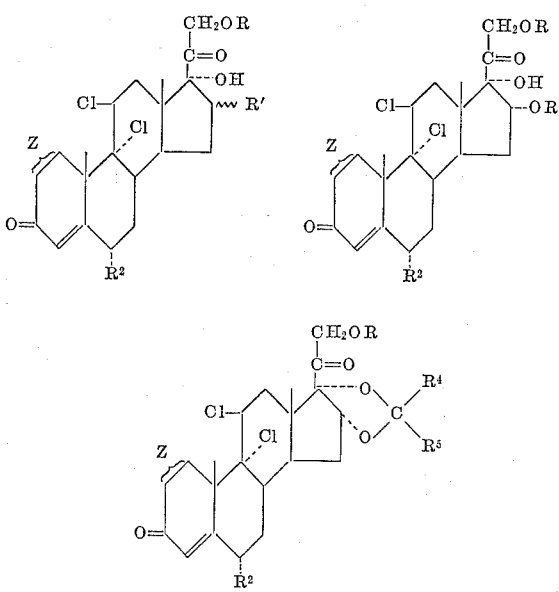

In the above formulas R and R³ represent hydrogen or a hydrocarbon carboxylic acyl group; R² represents the monofluoromethyl, difluoromethyl or trifluoromethyl group; R⁴ and R⁵ represent hydrogen or an alkyl, alicyclic aryl or aralkyl group containing from 1 to 8 carbon atoms; R′ represents hydrogen, α-methyl or β-methyl, and Z indicates a double bond or a saturated linkage between C-1 and C-2.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention may be prepared by a process illustrated by the following equation:

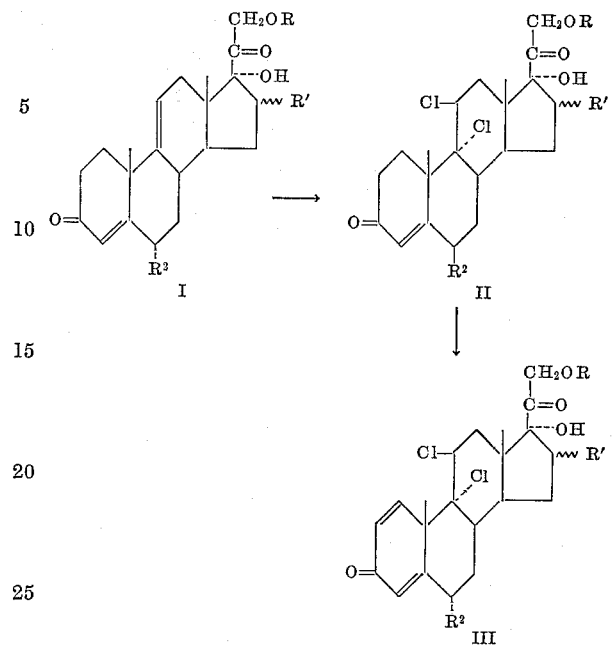

In the above equation, R, R′ and R² have the same meaning as previously set forth.

In practicing the process outlined above, 6α-monofluoromethyl or 6α-polyfluoromethyl-Δ⁴,⁹⁽¹¹⁾-pregnadiene-17α,21-diol-3,20-dione 21-acetate or the 16 (α or β)-methyl derivative thereof disclosed in our copending application Serial No. 68,374, filed November 10, 1960, are treated with a slight excess of a molar equivalent of chlorine in an inert solvent such as carbon tetrachloride at 15° C. for a period of about 5 minutes to form the corresponding 9α,11β - dichloro-6α-monofluoromethyl-Δ⁴-pregnene-17α,21-diol-3,20-dione 21-acetate and 9α,11β-dichloro-6α-polyfluoromethyl - Δ⁴-pregnene-17α,21 - diol-3,20-dione 21-acetate or the corresponding 16(α or β)-methyl derivatives thereof. For introduction of a double bond between C-1 and C-2 the latter compounds are refluxed with selenium dioxide in tertiary butanol or tertiary amyl alcohol and in the presence of catalytic amounts of pyridine. Alternatively, the dehydrogenation may be effected by refluxing the compound with 2,3-dichloro-5,6-dicyano-1,4-benzoquinone in dioxane. Upon conventional methods of saponification as with dilute methanolic potassium hydroxide, the acetoxy group at C-21 is converted into the hydroxy group which can be reesterified with other hydrocarbon carboxylic acid anhydrides of less than 12 carbon atoms.

The novel compounds of the present invention having a hydroxyl or acyloxy group at C-16α or having the cyclic acetal or ketal grouping at C-16α,17α are prepared by a process illustrated by the following equation:

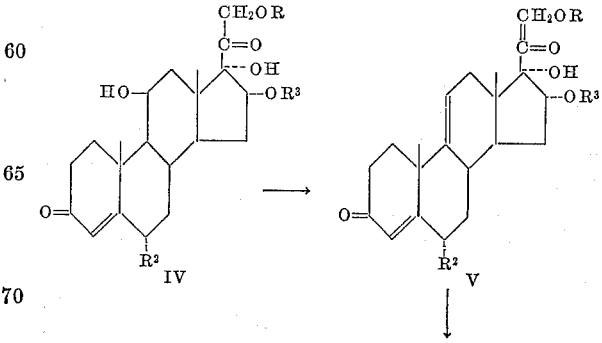

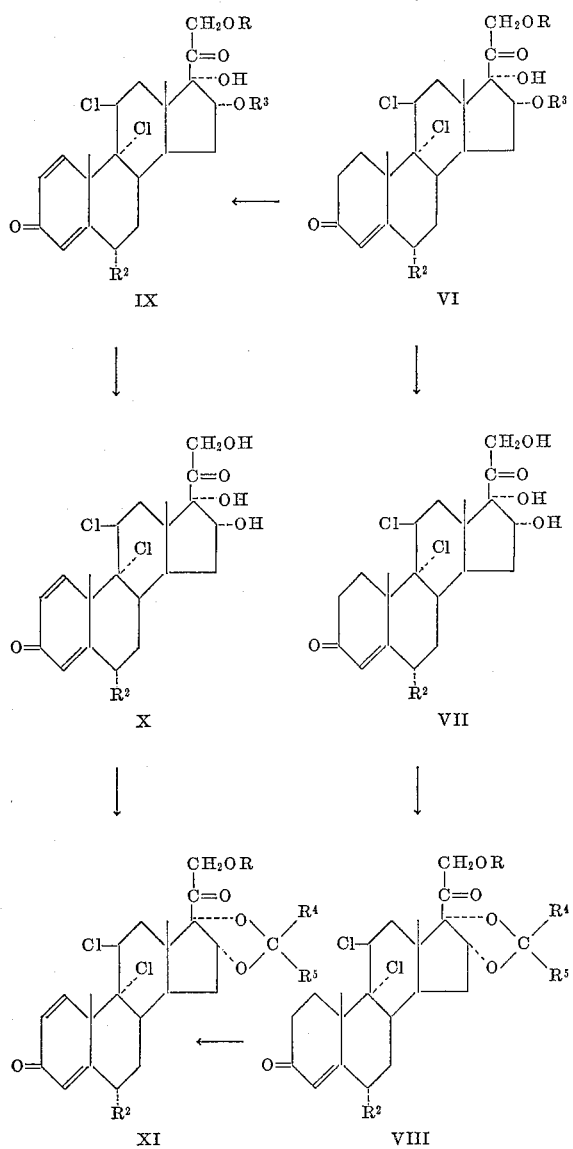

In the above formulas, R, $R^2$, $R^3$, $R^4$ and $R^5$ have the same meaning as previously set forth.

In practicing the process outlined above, the 16,21-diacylate of 6α-monofluoromethyl 16α-hydroxy-hydrocortison or of 6α-polyfluoromethyl-16α-hydroxy-hydrocortisone (IV:R and $R^3$=acyl), disclosed in our copending application, Serial No. 68,374 filed November 10, 1960, is heated with an organic sulfonyl chloride, preferably methanesulfonyl chloride, in a solvent such as dimethylformamide in the presence of a tertiary amine such as pyridine at 90° C. for about 2 hours to form the corresponding 9(11)-dehydro compounds (V). By subjecting the latter compounds to the action of chlorine as described above for the C-16 unsubstituted or C-16 methyl derivatives, there is formed the 16,21-diacylate of 6α-monofluoromethyl - 9α,11β - dichloro - Δ⁴ - pregnene-16α, 17α,21 - triol - 3,20-dione or of 6α-polyfluoromethyl-9α, 11β - dichloro - Δ⁴ - pregnene-16α,17α,21-triol-3,20-dione (VI:R and $R^3$=acyl). The ester groups are then hydrolyzed by alkaline treatment as, for example, by reaction with dilute methanolic potassium hydroxide solution at about 0° C. and under an atmosphere of nitrogen. The thus formed 6α-monofluoromethyl or 6α-polyfluoromethyl - 9α,11β - dichloro - Δ⁴-pregnene-16α,17α,21-triol-3,20-dione (VII) is reacted with an aldehyde or ketone such as formaldehyde, acetaldehyde, benzaldehyde, acetone, methyl ethyl ketone, butanone or cyclohexanone in the presence of catalytic amounts of perchloric acid to form the 16α,17α-cyclic acetals or 16α,17α-cyclic ketals of 6α-monofluoromethyl or 6α - polyfluoromethyl - 9α,11β - dichloro - Δ⁴-pregnene-16α,17α,21-triol-3,20-dione (VIII:R =hydrogen) which can be esterified with hydrocarbon carboxylic acid anhydrides of less than 12 carbon atoms by conventional methods to form the C-21 esters thereof (VIII:R=acyl). A double bond can then be introduced at C-1,2 by the method of dehydrogenation with selenium dioxide or 2,3-dichloro-5,6-dicyano-1,4-benzoquinone as set forth previously to afford the corresponding 1-dehydro derivatives (XI).

Alternatively the dehydrogenation at C-1,2 by the methods described above can be effected prior to the steps of hydrolysis and acetal or ketal formation. Thus upon dehydrogenation at C-1,2, 6α-monofluoromethyl or 6α-polyfluoromethyl-9α,11β-dichloro-Δ⁴-pregnene-16α, 17α,21 - triol - 3,20-dione-16,21-diacylate (VI:R and $R^3$ =acyl) are converted into the corresponding 1-dehydro derivative(IX). Upon saponification with dilute methanolic potassium hydroxide there is formed the 6α-monofluoromethyl or 6α - polyfluoromethyl - 9α,11β - dichloro-Δ¹,⁴-pregnadiene-16α,17α,21-triol-3,20-dione (X) which can be reacted with an aldehyde or ketone as described above to produce the 16α,17α-cyclic acetals or 16α,17α-cyclic ketals of 6α-monofluoromethyl or 6α-polyfluoromethyl - 9α,11β - dichloro - Δ¹,⁴-pregnadiene-16α,17α,21-triol-3,20-dione (XI:R=hydrogen).

The latter compound can be esterified by conventional methods with hydrocarbon carboxylic acid anhydrides of less than 12 carbon atoms to form the C-21 esters thereof (XI:R=acyl).

The following examples serve to illustrate but are not intended to limit the scope of the invention:

*Example I*

A solution of 1.6 g. of 6α-trifluoromethyl-Δ⁴,⁹⁽¹¹⁾-pregnadiene-17α,21-diol-3,20-dione 21-acetate disclosed in our copending application Serial No. 68,374 filed November 10, 1960, in 4 cc. of chloroform was treated under continuous stirring and in the course of 5 minutes with a solution of 300 mg. of chlorine in 10 cc. of carbon tetrachloride. The mixture was kept for 20 minutes at room temperature, then treated with 10 cc. of 5% aqueous sodium carbonate solution and the product was extracted several times with chloroform. The combined extract was washed with water to neutral, dried over anhydrous sodium sulfate and evaporated to dryness. The residue crystallized from acetone-hexane to yield 6α-trifluoromethyl - 9α,11β - dichloro - Δ⁴-pregnene-17α,21-diol-3,20-dione 21-acetate.

A solution of 500 mg. of the above compound in 24 cc. of t-butanol containing 0.08 cc. of pyridine was treated with 270 mg. of recently sublimed selenium dioxide and the mixture was refluxed with continuous stirring for 48 hours under an atmosphere of nitrogen. The solution was filtered through celite, the solvent was removed under reduced pressure and the residue was chromatographed on neutral alumina. There was thus obtained 6α-trifluoromethyl-9α,11β-dichloro-Δ¹,⁴-pregnadiene-17α,21-diol-3,20-dione 21-acetate.

A mixture of 1 g. of the above compound and 50 cc. of 1% methanolic potassium hydroxide solution was kept at a temperature around 0° C. for 1 hour under an atmosphere of nitrogen, acidified with acetic acid, concentrated to a small volume and diluted with water; the precipitate formed was collected by filtration, washed with water, dried and recrystallized from acetone-hexane, thus yielding the free 6α-trifluoromethyl-9α,11β-dichloro-Δ¹,⁴-pregnadiene-17α,21-diol-3,20-dione.

A mixture of 500 mg. of the above compound, 5 cc. of pyridine and 1 cc. of propionic anhydride was kept overnight at room temperature, poured into water, heated on the steam bath for half an hour, cooled and the precipitate was collected, washed with water, dried and recrystallized from acetone-hexane, thus furnishing 6α-trifluoromethyl - 9α,11β - dichloro-$\Delta^{1,4}$-pregnadiene-17α,21-diol-3,20-dione 21-propionate.

*Example II*

By essentially following the procedure described in Example I, 5 g. of 6α-trifluoromethyl-16α-methyl-$\Delta^{4,9(11)}$-pregnadiene-17α,21-diol-3,20-dione 21-acetate was converted into 6α-trifluoromethyl-16α-methyl-9α,11β-dichloro-$\Delta^4$-pregnene-17α,21-diol-3,20-dione 21-acetate and then into 6α-trifluoromethyl-16α-methyl-9α,11β-dichloro-$\Delta^{1,4}$-pregnadiene-17α,21-diol-3,20-dione 21-acetate.

*Example III*

A mixture of 4 g. of 6α-trifluoromethyl-16α-hydroxy-hydrocortisone-16,21-diacetate (described in our copending application Serial No. 68,374 filed November 10, 1960, 2 g. of methanesulfonyl chloride, 60 cc. of dimethylformamide and 4 cc. of pyridine was heated at 80° C. for one hour, cooled, diluted with water and the product was extracted with ethyl acetate; the extract was washed with water, dried over anhydrous sodium sulfate and the ethyl acetate was evaporated. By recrystallization of the residue from acetone-hexane there was obtained 6α-trifluoromethyl - $\Delta^{4,9(11)}$ - pregnadiene - 16α,17α,21 - triol - 3,20-dione-16,21-diacetate.

In a similar manner 6α-difluoromethyl-16α-hydroxy-hydrocortisone-16,21-diacetate and 6α-monofluoromethyl-16α-hydroxy-hydrocortisone-16,21-diacetate were converted into 6α-difluoromethyl-$\Delta^{4,9(11)}$-pregnadiene-16α,17α,21-triol-3,20-dione-16,21-diacetate and 6α-monofluoromethyl - $\Delta^{4,9(11)}$ - pregnadiene - 16α,17α,21 - triol-3,20-dione-16,21-diacetate.

*Example IV*

By essentially following the procedure described in Example I, 5 g. of 6α-trifluoromethyl-$\Delta^{4,9(11)}$-pregnadiene-16α,17α-21-triol-3,20-dione 16,21-diacetate was converted into 6α-trifluoromethyl-19α,11β-dichloro-$\Delta^4$-pregnene-16α,17α,21-triol-3,20-dione 16,21-diacetate and then into a 6α-trifluoromethyl - 9α,11β - dichloro - $\Delta^{1,4}$ - pregnadiene-16α,17α,21-triol-3,20-dione 16,21-diacetate; by the hydrolysis with methanolic potassium hydroxide there was obtained the free 6α-trifluoromethyl-9α,11β-dichloro-$\Delta^{1,4}$-pregnadiene-16α,17α,21-triol-3,20-dione.

A mixture of 2 g. of the latter compound, 50 cc. of acetone and 1 cc. of 70% perchloric acid was kept at room temperature for 1 hour, neutralized with sodium bicarbonate solution and diluted with saturated aqueous sodium chloride solution; the precipitate was collected, washed with a little cold water, dried and recrystallized from acetone-hexane, thus giving the 16,17-acetonide of 6α - trifluoromethyl - 9α,11β - dichloro - $\Delta^{1,4}$ - pregnadiene-16α,17α,21-triol-3,20-dione.

Upon subsequent treatment with acetic anhydride in pyridine solution there was obtained the 16,17-acetonide of 6α - trifluoromethyl - 9α,11β - dichloro - $\Delta^{1,4}$ - pregnadiene-16α,17α,21-triol-3,20-dione 21-acetate.

*Example V*

A mixture of 1 g. of 6α-trifluoromethyl-9α,11β-dichloro-$\Delta^4$ - pregnene - 16α,17α, 21 - triol - 3,20 - dione 16,21-diacetate, intermediate in the previous example, and 50 cc. of a 1% solution of potassium hydroxide in methanol was kept at 0° C., under the conditions described for this hydrolysis in Example I; there was thus obtained the free 6α - trifluoromethyl - 9α,11β - dichloro - $\Delta^4$ - pregnene-16α,17α,21-triol-3,20-dione.

A solution of 500 mg. of the above compound in 50 cc. of chloroform was treated with 2 g. of acetaldehyde and a few drops of 3 N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding the 16,17-acetaldehyde-acetal of 6α-trifluoromethyl- - 9α,11β - dichloro - $\Delta^4$ - pregnene - 16α,17α,21-triol-3,20-dione. Upon subsequent treatment with propionic anhydride in pyridine solution (cf. Example I) there was obtained the 21-propionate of the latter compound.

A mixture of 500 mg. of the above compound, 10 cc. of dioxane and 350 mg. of 2,3-dichloro-5,6-dicyano-1,4-benzoquinone was refluxed for 18 hours, it was then cooled, the 2,3 - dichloro - 5,6 - dicyano - 1,4 - benzohydroquinone formed during the reaction filtered off and the filtrate evaporated to dryness. The residue was dissolved in acetone and filtered through a column of 10 g. of neutral alumina. Crystallization from acetone-ether gave the 16,17-acetaldehyde acetal of 6α-trifluoromethyl-9α, 11β - dichloro - $\Delta^{1,4}$ - pregnadiene - 16α,17α - 21 - triol-3,20-dione 21-propionate.

*Example VI*

In accordance with the method described in Example I, 5 g. of 6α - trifluoromethyl - 16β - methyl - $\Delta^{4,9(11)}$-pregnadiene-17α,21-diol-3,20-dione 21-acetate was converted into 6α - trifluoromethyl - 16β - methyl - 9α,11β-dichloro - $\Delta^4$ - pregnene - 17α,21 - diol-3,20 - dione 21-acetate and then into 6α-trifluoromethyl-16β-methyl-9α,11β - dichloro - $\Delta^{1,4}$ - pregnadiene - 17α,21 - diol-3,20-dione 21-acetate. Upon hydrolysis with methanolic potassium hydroxide there was obtained the free compounds 6α - trifluoromethyl - 16β - methyl - 9α,11β-dichloro - $\Delta^4$ - pregnene - 17α,21 - diol - 3,20 - dione and 6α - trifluoromethyl - 16β - methyl - 9α,11β - dichloro-$\Delta^{1,4}$-pregnadiene-17α,21-diol-3,20-dione.

*Example VII*

By essentially following the method described in Example IV, 6α-monofluoromethyl-$\Delta^{4,9(11)}$-pregnadiene-16α, 17α,21-triol-3,20-dione-16,21-diacetate (cf. Example III) was converted into 6α-monofluoromethyl-9α,11β-dichloro-$\Delta^4$ - pregnene - 16α,17α,21 - triol - 3,20 - dione 16,21-diacetate and then into 6α-monofluoromethyl-9α,11β-dichloro - $\Delta^{1,4}$ - pregnadiene - 16α,17α,21 - triol - 3,20-dione-16,21-diacetate; by hydrolysis with methanolic potassium hydroxide there was obtained the free 6α-monofluoromethyl - 9α,11β - dichloro - $\Delta^{1,4}$ - pregnadiene - 16α, 17α,21-triol-3,20-dione.

By treatment with acetone in the presence of perchloric acid as set forth in Example IV, the 16,17-acetonide of 6α - monofluoromethyl - 9α,11β - dichloro - $\Delta^{1,4}$ - pregnadiene-16α,17α,21-triol-3,20-dione was formed, which upon subsequent treatment with acetic anhydride in pyridine solution was transformed into the 16,17-acetonide of 6α-monofluoromethyl - 9α,11β - dichloro - $\Delta^{1,4}$ - pregnadiene-16α,17α,21-triol-3,20-dione 21-acetate.

*Example VIII*

The 16,21-diacetate of 6α-monofluoromethyl-9α,11β-dichloro - $\Delta^4$ - pregnene - 16α,17α,21 - triol - 3,20 - dione described in Example VII was hydrolyzed in the manner set forth in Example V to produce the free 6α-monofluoromethyl - 9α,11β - dichloro -$\Delta^4$ - pregnene - 16α,17α,21-triol-3,20-dione and then subsequently treated with acetaldehyde as described in the aforementioned Example V to produce the 16,17-acetaldehyde acetal of 6α-monofluoromethyl - 9α,11β - dichloro - $\Delta^4$ - pregnene - 16α,17α,21-triol-3,20-dione. Subsequent treatment with acetic anhydride in pyridine gave the corresponding acetate.

*Example IX*

By following the method of Example I, 6α-monofluoromethyl-16α-methyl - $\Delta^{4,9(11)}$ - pregnadiene - 17α,21 - diol- 3,20-dione 21-acetate and the corresponding 16β-methyl-derivative were converted into 6α-monofluoromethyl-9α,11β-dichloro-16α-methyl - Δ⁴ - pregnene-17α,21 - diol-3,20-dione 21-acetate, and 6α-monofluoromethyl-9α,11β-dichloro-16β-methyl-Δ⁴-pregnene - 17α,21 - diol - 3,20-dione 21-acetate. Upon subsequent dehydrogenation with selenium dioxide the corresponding 6α-monofluoromethyl-9α,11β-dichloro-16α-methyl-Δ¹,⁴ - pregnadiene - 17α,21-diol-3,20-dione 21-acetate and 6α-monofluoromethyl-9α,11β-dichloro-16β - methyl - Δ¹,⁴ - pregnadiene - 17α,21-diol-3,20-dione 21-acetate were obtained.

*Example X*

By following the method of Example I, 6α-difluoromethyl-Δ⁴,⁹⁽¹¹⁾-pregnadiene-17α,21-diol - 3,20 - dione 21-acetate was converted into 6α-difluoromethyl-9α,11β-dichloro-Δ⁴-pregnene-17α,21-diol-3,20-dione 21-acetate and then into 6α-difluoromethyl-9α,11β-dichloro-Δ¹,⁴-pregnadiene-17α,21-diol-3,20-dione-21-acetate.

In a similar manner the corresponding 6α-monofluoromethyl compounds were prepared from 6α-monofluoromethyl-Δ⁴,⁹⁽¹¹⁾-pregnadiene-17α,21-diol - 3,20 - dione 21-acetate.

*Example XI*

By following the method of Example I, 6α-difluoromethyl-16α-methyl-Δ⁴,⁹⁽¹¹⁾-pregnadiene-17α,21 - diol-3,20-dione 21-acetate and the corresponding 16β-methyl derivative were converted into 6α-difluoromethyl-9α,11β-dichloro-16α-methyl-Δ⁴-pregnene-17α,21-diol-3,20-dione 21-acetate and 6α-difluoromethyl-9α,11β-dichloro-16β-methyl-Δ⁴-pregnene-17α,21-diol-3,20-dione 21-acetate.

Upon dehydrogenation with 2,3-dichloro-5,6-dicyano-1,4-benzoquinone as described in Example V, the corresponding 6α-difluoromethyl-9α,11β-dichloro-16α-methyl-Δ¹,⁴-pregnadiene-17α,21-diol-3,20-dione 21-acetate and 6α-difluoromethyl-9α,11β-dichloro-16β-methyl - Δ¹,⁴ - pregnadiene-17α,21-diol-3,20-dione 21-acetate were obtained.

*Example XII*

By following the method described in Example IV, 6α-difluoromethyl-Δ⁴,⁹⁽¹¹⁾-pregnadiene - 16α,17α,21 - triol-3,20-dione-16,21-diacetate, described in Example III, was converted into 6α-difluoromethyl-9α,11β-dichloro-Δ⁴-pregnene-16α,17α,21-triol-3,20-dione-16,21-diacetate and then into 6α-difluoromethyl-9α,11β-dichloro-Δ¹,⁴-pregnadiene-16α,17α,21-triol-3,20-dione 16,21-diacetate. Upon hydrolysis with methanolic potassium hydroxide there was obtained the free 6α-difluoromethyl-9α,11β-dichloro-Δ¹,⁴-pregnadiene-16α,17α,21-triol-3,20-dione.

By treatment with acetone in the presence of perchloric acid as set forth in Example IV, the 16,17-acetonide of 6α-difluoromethyl-9α,11β - dichloro - Δ¹,⁴ - pregnadiene-16α,17α,21-triol-3,20-dione was formed, which upon subsequent treatment with acetic anhydride in pyridine solution was transformed into the 16,17-acetonide of 6α-difluoromethyl - 9α,11β - dichloro - Δ¹,⁴ - pregnadiene-16α,17α,21-triol-3,20-dione 21-acetate.

*Example XIII*

The 16,21-diacetate of 6α-difluoromethyl-9α,11β-dichloro-Δ⁴-pregnene-16α,17α,21-triol-3,20-dione described in Example XII was hydrolyzed in the manner set forth in Example V to produce the free 6α-difluoromethyl 9α,11β-dichloro-Δ⁴-pregnene-16α,17α,21-triol-3,20 - dione and then subsequently treated with acetaldehyde as described in Example V to produce the 16,17-acetaldehyde acetal of 6α-difluoromethyl-9α,11β-dichloro-Δ⁴-pregnene-16α,17α,21-triol-3,20-dione.

Acetylation of the above compound gave the corresponding 16,17-acetaldehyde acetal of 6α-difluoromethyl-9α,11β-dichloro-Δ⁴-pregnene-16α,17α,21-triol-3,20-dione.

We claim:

1. A compound of the following formula:

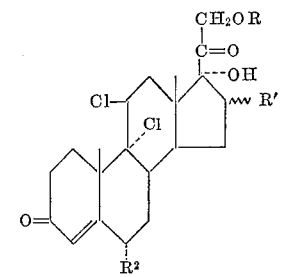

wherein R is selected from the group consisting of hydrogen and a hydrocarbon carboxylic acyl group of less than 12 carbon atoms; R' is selected from the group consisting of hydrogen, α-methyl and β-methyl; and R² is selected from the group consisting of a trifluoromethyl, difluoromethyl and a monofluoromethyl group.

2. 6α-monofluoromethyl-9α,11β-dichloro-Δ⁴ - pregnene-17α,21-diol-3,20-dione 21-acetate.

3. 6α-difluoromethyl-16α-methyl - 9α,11β - dichloro-Δ⁴-pregnene-17α,21-diol-3,20-dione 21-acetate.

4. 6α-trifluoromethyl-16β-methyl - 9α,11β - dichloro-Δ⁴-pregnene-17α,21-diol-3,20-dione 21-acetate.

5. 6α-difluoromethyl - 9α,11β - dichloro - Δ⁴ - pregnene-17α,21-diol-3,20-dione 21-acetate.

6. A compound of the following formula:

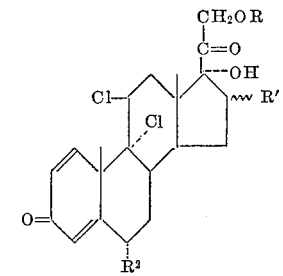

wherein R is selected from the group consisting of hydrogen and a hydrocarbon carboxylic acyl group of less than 12 carbon atoms; R' is selected from the group consisting of hydrogen, α-methyl and β-methyl, and R² is selected from the group consisting of a trifluoromethyl, difluoromethyl and a monofluoromethyl group.

7. 6α-difluoromethyl-16α-methyl-9α,11β-dichloro-Δ¹,⁴-pregnadiene-17α,21-diol-3,20-dione 21-acetate.

8. 6α - monofluoromethyl - 16β - methyl - 9α,11β - dichloro-Δ¹,⁴-pregnadiene-17α,21-diol-3,20-dione 21-acetate.

9. 6α - trifluoromethyl - 9α,11β - dichloro - Δ¹,⁴ - pregnadiene-17α,21-diol-3,20-dione 21-propionate.

10. 6α - monofluoromethyl - 9α,11β - dichloro - Δ¹,⁴ - pregnadiene-17α,21-diol-3,20-dione 21-acetate.

11. 6α - difluoromethyl - 16β - methyl - 9α,11β - dichloro-Δ¹,⁴-pregnadiene-17α,21-diol-3,20-dione 21-acetate.

12. 6α - monofluoromethyl - 16α - methyl - 9α,11β - dichloro - Δ¹,⁴ - pregnadiene - 17α,21 - diol - 3,20 - dione 21-acetate.

13. 6α - trifluoromethyl - 16α - methyl - 9α,11β - dichloro - Δ¹,⁴ - pregnadiene - 17α,21 - diol - 3,20 - dione 21-acetate.

14. 6α - difluoromethyl - 9α,11β - dichloro - Δ¹,⁴ - pregnadiene-17α,21-diol-3,20-dione 21-acetate.

15. A compound of the following formula:

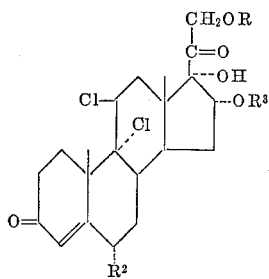

wherein R and $R^3$ are selected from the group consisting of hydrogen and a hydrocarbon carboxylic acyl group of less than 12 carbon atoms and $R^2$ is selected from the group consisting of a trifluoromethyl, difluoromethyl and a monofluoromethyl group.

16. $6\alpha$ - monofluoromethyl - $9\alpha,11\beta$ - dichloro - $\Delta^4$ - pregnene-$16\alpha,17\alpha,21$-triol-3,20-dione 16,21-diacetate.

17. $6\alpha$ - trifluoromethyl - $9\alpha,11\beta$ - dichloro - $\Delta^4$ - pregnene-$16\alpha,17\alpha,21$-triol-3,20-dione 16,21-diacetate.

18. $6\alpha$ - difluoromethyl - $9\alpha,11\beta$ - dichloro - $\Delta^4$ - pregnene-$16\alpha,17\alpha,21$-triol-3,20-dione 16,21-diacetate.

19. A compound of the following formula:

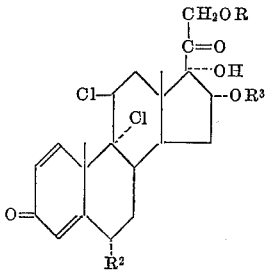

wherein R and $R^3$ are selected from the group consisting of hydrogen and a hydrocarbon carboxylic acyl group of less than 12 carbon atoms; and $R^2$ is selected from the group consisting of a trifluoromethlyl, difluoromethyl and a monofluoromethyl group.

20. $6\alpha$ - monofluoromethyl - $9\alpha,11\beta$ - dichloro - $\Delta^{1,4}$ - pregnadiene-$16\alpha,17\alpha,21$-triol-3,20-dione 16,21-diacetate.

21. $6\alpha$ - trifluoromethyl - $9\alpha,11\beta$ - dichloro - $\Delta^{1,4}$ - pregnadiene-$16\alpha,17\alpha,21$-triol-3,20-dione 16-21 diacetate.

22. $6\alpha$ - difluoromethyl - $9\alpha,11\beta$ - dichloro - $\Delta^{1,4}$ - pregnadiene-$16\alpha,17\alpha,21$-triol-3,20-dione 16,21-diacetate.

23. A compound of the following formula:

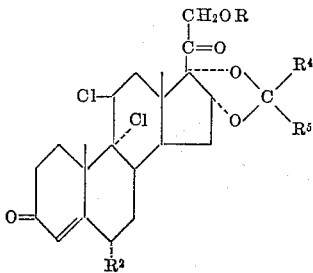

wherein R is selected from the group consisting of hydrogen and a hydrocarbon carboxylic acyl group of less than 12 carbon atoms; $R^2$ is selected from the group consisting of a trifluoromethyl, difluoromethyl and a monofluoromethyl group; and $R^4$ and $R^5$ are selected from the group consisting of hydrogen and an alkyl, alicyclic, aryl and aralkyl group containing from 1 to 8 carbon atoms.

24. $6\alpha$ - trifluoromethyl - $9\alpha,11\beta$ - dichloro - $\Delta^4$ - pregnene-$16\alpha,17\alpha,21$-triol-3,20-dione $16\alpha,17\alpha$-acetonide 21-acetate.

25. $6\alpha$ - monofluoromethyl - $9\alpha,11\beta$ - dichloro - $\Delta^4$ - pregnene - $16\alpha,17\alpha,21$ - triol - 3,20 - dione - $16\alpha,17\alpha$ - acetonide 21-acetate.

26. $6\alpha$ - difluoromethyl - $9\alpha,11\beta$ - dichloro - $\Delta^4$ - pregnene-$16\alpha,17\alpha,21$-triol-3,20-dione $16\alpha,17\alpha$-acetonide 21-acetate.

27. A compound of the following formula:

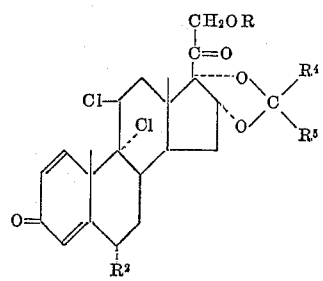

wherein R is selected from the group consisting of hydrogen and a hydrocarbon carboxylic acyl group of less than 12 carbon atoms; $R^2$ is selected from the group consisting of a trifluoromethyl, difluormethyl and a monofluoromethyl group; and $R^4$ and $R^5$ are selected from the group consisting of hydrogen and an alkyl, alicyclic, aryl and aralkyl group containing from 1 to 8 carbon atoms.

28. $6\alpha$ - trifluoromethyl - $9\alpha,11\beta$ - dichloro - $\Delta^{1,4}$ - pregnadiene-$16\alpha,17\alpha,21$-triol-3,20-dione $16\alpha,17\alpha$ - acetonide 21-acetate.

29. $6\alpha$ - monofluoromethyl - $9\alpha,11\beta$ - dichloro - $\Delta^{1,4}$ - pregnadiene-$16\alpha,17\alpha,21$-triol-3,20-dione $16\alpha,17\alpha$ - acetonide 21-acetate.

30. $6\alpha$ - difluoromethyl - $9\alpha,11\beta$ - dichloro - $\Delta^{1,4}$ - pregnadiene-$16\alpha,17\alpha,21$-triol-3,20-dione $16\alpha,17\alpha$ - acetonide 21-acetate.

References Cited in the file of this patent

UNITED STATES PATENTS 2,894,963     Gould _____ July 14, 1959